United States Patent [19]

Ursel et al.

[11] 4,029,259

[45] June 14, 1977

[54] ARRANGEMENT FOR WASHING TRANSPARENT PARTS OF VEHICLES

[75] Inventors: Eckhard Ursel, Buhl; Peter Kessler, Buhlertal, both of Germany

[73] Assignee: Robert Bosch G.m.b.H., Stuttgart, Germany

[22] Filed: Jan. 22, 1976

[21] Appl. No.: 651,393

[30] Foreign Application Priority Data

Jan. 30, 1975 Germany .......................... 2503730

[52] U.S. Cl. .......................... 239/284 A; 239/289; 293/65; 293/69 R

[51] Int. Cl.² .......................................... B60S 1/46

[58] Field of Search ......... 239/284, 289; 293/69 R, 293/65, 66, 67; 240/7.1 R

[56] References Cited

UNITED STATES PATENTS

| | | | |
|---|---|---|---|
| 2,487,496 | 11/1949 | Tyson | 293/69 R |
| 3,213,493 | 10/1965 | Chichester | 239/284 X |
| 3,433,416 | 3/1969 | Bauer | 239/284 |

FOREIGN PATENTS OR APPLICATIONS

| | | | |
|---|---|---|---|
| 378,710 | 7/1964 | Switzerland | 239/284 |
| 686,923 | 2/1953 | United Kingdom | 239/284 |

Primary Examiner—John J. Love
Attorney, Agent, or Firm—Michael J. Striker

[57] ABSTRACT

Arrangement for washing transparent parts of vehicles, particularly windshields and lightlamp lens shields of motor vehicles. The arrangement includes a solid liquid conducting member and a bore-like liquid supplying channel extending therethrough between an inlet port and an outlet port. A liquid conduit communicating with a liquid container has a terminal portion distant from the container and provided with a connecting piece press-fit or with prestress inserted in the inlet port. A nozzle body is associated with the outlet port and has a discharge aperture aimed at the transparent part to be washed. A selectively actuable liquid releasing means is operable to release liquid to travel from the container under pressure at the driver's command to the nozzle body.

18 Claims, 2 Drawing Figures

ARRANGEMENT FOR WASHING TRANSPARENT PARTS OF VEHICLES

BACKGROUND OF THE INVENTION

The present invention relates to an arrangement for washing, during traffic conditions, transparent parts of vehicles, such as windshields and, in particular, lens shields of light lamps. In traffic conditions, these parts become obscured by dust particles, mud and the like settling down on them. The washing of these parts, while the vehicle is driven, enhances driving safety. Various washing arrangements for these parts have been proposed, constructed and employed.

The arrangements of this type which have been known hitherto usually have tubular conduits for the washing liquid, communicating with a liquid source and connected to a nozzle means. In the specific case of arrangements for washing lens shields of vehicle lightlamps, this tubular conduit is led through a hollow-cross attached to the vehicle bumper. The attachment of these conduits and nozzle means to the cross-guard is achieved by means of fixtures attached and operable from behind the bumper cross-guard. Thereby, the liquid conduit is loosely located inside the hollow space of the cross-guard and shares in the vibrations the vehicle experiences in traffic. These vibrations often cause detachment of the conduit. To obviate this effect, attempts have been made to firmly tie the liquid conduit to the crossguard on the bumper by fixtures, such as bolts or screws and nuts. These fixtures are accessible from the rear side only of the bumper and relatively long instruments are needed for their operation. There is however, usually not available space enough between the cross-guard and the bumper and the front side of the motor car body. This space is generally very narrow. Consequently, in order to mount on or off the conduit or nozzle body or to repair them, it is usually necessary to detach the cross-guard from the bumper or to demount even the bumper itself from the motor car body.

All this is a great disadvantage of the known arrangement of this nature from the technical as well as functional standpoint, and also from the viewpoint of the mounting and repair costs.

SUMMARY OF THE INVENTION

It is an object of the present invention to provide a washing arrangement for transparent parts of vehicles, especially for windshields and lightlamp lens shields of motor vehicles in which the known drawbacks and insufficiencies of such arrangements are overcome.

It is another object of the present invention to provide a washing arrangement of the above mentioned type having a liquid supplying channel leading from the liquid container through a solid body and adapted to feed the washing liquid to a nozzle actuable to spray the liquid onto said transparent parts, such as windshields and light-lamp lens shields.

A further object of the present invention is to provide a motor car lightlamp rinsing and washing arrangement being in the form of a solid cross-guard configurated to be readily attachable to the motor car bumper in a crossover relationship therewith, which cross-guard comprises in its interior a longitudinally extending bore-like channel adapted to supply a washing liquid to a nozzle arranged to spray the washing liquid onto the lens shield of the lightlamp of a motor car associated to this cross-guard.

Yet another object of the present invention is to provide a rinsing and washing arrangement for lens shields of motor car lightlamps which arrangement has in said liquid supplying channel an inlet port connectable to said liquid conduit and an outlet port wherefrom the liquid is directed by a nozzle onto the lens shield of the lightlamp for washing the same.

Still another object of the present invention is to provide a washing arrangement of the above mentioned type wherein in the terminal of said liquid conduit carries a connecting piece easily insertable into, and press-fit engageable with, the inlet port of said liquid supplying channel.

A concomitant object of the present invention is to provide a lightlamp washing arrangement having a nozzle body easily insertable into, and press-fit engageable with, the outlet port of a liquid supplying channel and having a discharging aperture aimed at the lens shield of the motor car lightlamp.

A further object of the present invention is to provide a lightlamp lens shield washing arrangement including means selectively operable to release the washing liquid at the motor car driver's command for producing washing liquid spraying onto and over the lens shield.

An additional object of the present invention is to provide a washing arrangement of the mentioned type including a carrier member easily insertable into, and press-fit engageble with, the outlet port of the liquid supplying channel and comprising at least a pair of nozzle bodies whose discharge apertures are aimed at different angles at the lens shield, so that they direct the washing liquid onto said shield under various angles and securing an efficient cleaning of said shield.

Yet another object of the present invention is to provide said washing arrangement in a configuration which may be easily and simply mounted on the bumper of a motor car.

In accordance with the above indicated objects and others which will become apparent hereinafter, the arrangement of the present invention comprises, briefly stated, a solid member attachable to the motor car body in proximity of the transparent part to be washed. This solid member may be in the form of a cross-guard attachable to the motor car bumper. This solid member has in its interior a bore-like channel for the liquid supply which channel has therein an input port and an output port. Through this channel, a liquid conduit communicating with a container of a rinsing and washing liquid is connected to a liquid spraying nozzle means facing the transparent part to be washed. The nozzle means in the form of a nozzle body is located at the outlet port of said member. More than one nozzle body may be placed at this outlet. The construction of the present arrangement is configurated so that the cross-guard with the liquid supplying channel, as well as the nozzle means, are appropriately positioned in regard both to the liquid supplying conduit and to the lens shield of the motor car to be washed.

By the inverted construction of the arrangement, an important simplification is achieved of the mounting and demounting operations, since the nozzle means is constructed so that it is simply inserted into the outlet port of the liquid supplying channel and becomes press-fit engaged therewith.

A particular advantage of the invention is that a plurality of nozzle bodies may be employed for rinsing and washing one and the same lens shield of the lightlamp. For achieving this effect, at least a pair of nozzle bodies is located in a carrier which carrier is inserted into the outlet port of the liquid supplying channel and is arranged to press-fit engage the same.

Similarly, a specifically simplified interconnection between the liquid supplying channel and the nozzle body or nozzle bodies is obtained by providing at the terminal of the liquid supplying conduit a connecting piece which is formed to be easily inserted into the inlet port of the liquid supplying channel and to press-fit engage the same.

For this purpose, both the inlet and outlet ports of the liquid supplying channels have a diameter greater than the remainder of the channel. Thus, there are totally omitted any fastening means for the nozzle body and for its carrier, as well as for the connecting member of the liquid supplying conduit. An efficient interconnection is obtained by that said connecting member and said nozzle body of the carrier of the latter are constructed so that they may be press-fit engaged each with its corresponding port of the liquid supplying channel.

This effect may be obtained by employing an elastic material for making the constructional elements which ought to be inserted into the liquid supplying channel ports.

The cross-guard attachable to the bumper also may be made of an elastic material. In this case, it is advantageous to insert into the outlet port of the liquid supplying channel the nozzle body of the carrier or the nozzle body while enlarging this channel port during the inserting operation.

In this case, a further advantage is achieved when also the connecting member for the liquid supplying channel is introduced into the channel inlet port corresponding thereto with enlargement of said inlet port.

The invention also provides for achieving a good sealing effect between the cross-guard on the bumper and the constructional elements to be inserted into said ports of the liquid supplying channel, as well as a good securing of these elements against undesirable detactment or separation. This is achieved in that these elements are provided with at least one flanged annular peripheral means obstructing the disengagement or tearing out of said elements from said ports.

From time to time, it may become necessary to repeatedly mount the cross-guard onto the motor car bumper in a correct position and to properly locate the nozzle body such that its discharge aperture accurately aims at the lens shield to be washed. For this purpose, it has appeared to be advantageous to provide the cross-guard on the bumper with a threaded bolt firmly anchored therein and arranged to penetrate, in fully screwed-in condition, into a threaded hole provided in the bumper.

The cross-guard of the invention may be an individual component or also the usual bumper cross-guard adjusted according to the present invention.

The novel features which are considered as characteristic for the present invention are set forth, in particular, in the appended claims. The invention itself, however, both as its construction and its method of operation are concerned, together with additional objects and advantages thereof, will be best understood from the following description of specific embodiments when read in connection with the accompanying drawings.

BRIEF DESCRIPTION OF THE DRAWINGS

Referring now to the drawings, it may be seen that.

DESCRIPTION OF THE PREFERRED EMBODIMENTS

Figure 1:
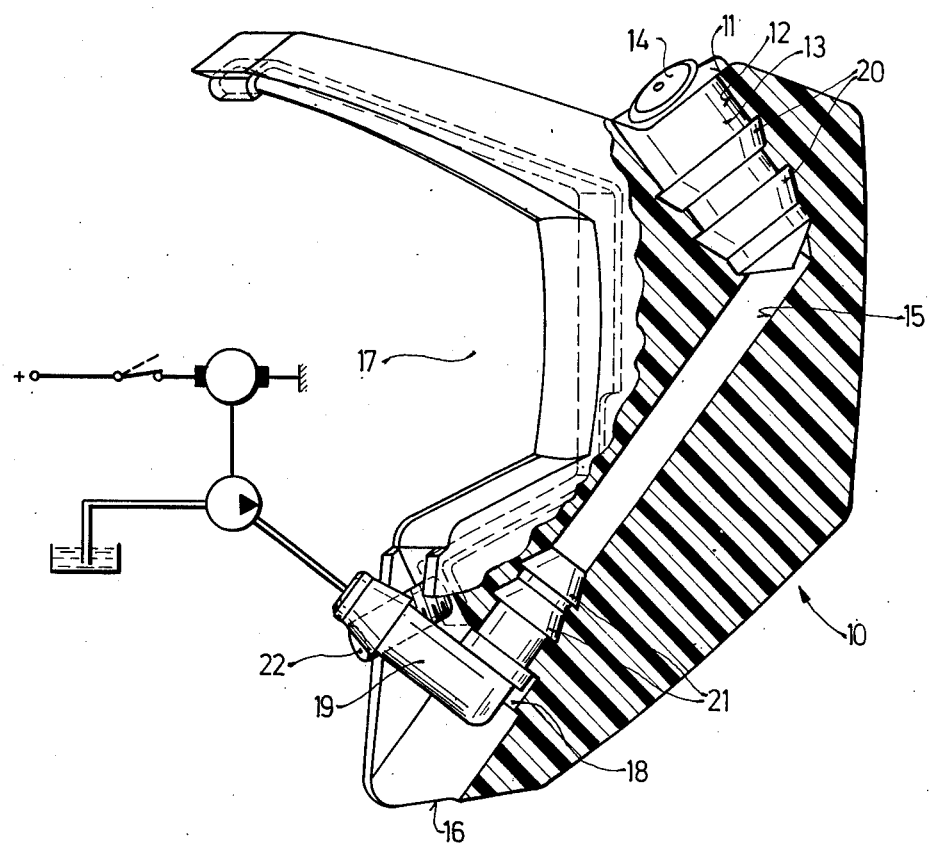
FIG. 1 shows a cross-sectional view of a cross-guard according to the present invention attachable to a motor car bumper, which cross-guard is provided with a liquid supplying interior channel and a connecting piece for the liquid supplying conduit communicating with a liquid container.

FIG. 1 illustrates a solid cross-guard 10 of the invention attached to a motor car bumper. The cross-guard is made of a rubber material of elastic character. On the side 11 facing a lightlamp of the motor car (not shown in this drawing), this cross-guard is provided with a liquid outlet port 12. Into this outlet port 12, a carrier 13 for a pair of nozzle bodies 14 is inserted. This carrier is shown in more detail in FIG. 2.

The outlet port 12 is at the end of a liquid supplying channel 15 extending through the interior of the cross-guard 10 affixed to a bumper. This liquid supplying channel 15 opens at the side distant from the outlet side 11 into an inlet port 18.

The cross-guard 10 on the bumper is configurated so that it has on its rear side a wide notch 17 corresponding to the cross-section of the bumper. On this notch 17, the cross-guard 10 is engaged with, and attached to, the bumper not represented in FIG. 1. It is apparent that the distal side 16 of the cross-guard 10, when this guard is attached to the bumper, has the inlet port 18 of the liquid supplying channel 15 underneath the bumper. The outlet port 12 of the liquid supplying channel 15 is positioned over the bumper and adjacent an associated lightlamp of a motor car.

A connecting piece 19 is inserted into the inlet port 18 of the liquid supplying channel 15. This connecting piece is located at a terminal of an outside liquid supplying conduit, not shown in the drawing. This liquid supplying conduit connects an also not illustrated container of a washing liquid with the liquid supplying channel 15 and therethrough with the nozzle bodies 14 located in said carrier 13. Each of these nozzle bodies 14 has one single aperture and each of these apertures is aimed at the lens shield of the light-lamp at different angles.

Both the inlet port and the outlet port, 18 and 12 respectively, have a diameter greater than that of the remainder of the liquid supplying channel 15. The liquid passage openings provided in the carrier 13 and in the connecting piece 19 are adjusted to the diameter of the liquid supplying channel 15 so that there is no obstacle hampering the washing liquid flow.

The mentioned constructional elements 13 and 19 located in the one and the other of the channel ports 12 and 18 are press-fit inserted in these ports with a sort of prestress.

The cross-guard 10 may be made of an elastic material. In this case, this prestress is obtained, in the exemplary embodiment illustrated by FIG. 1, in the way of first enlarging the channel ports 18 and 12 corresponding to the constructional elements 19 and 13 and then inserting these elements each into its corresponding port temporarily enlarged.

The cross-guard 10 attachable to a motor car bumper also may be made of a relatively rigid and not enough elastic material. In this case, it is advantageous to make the constructional elements 13 and 19 to be inserted into the channel ports 12 and 18 of an elastic material. The elasticity of these elements provides for the press-fit securing of these elements with the needed pre-stressing effect. Thereby, the carrier 13, as well as the connection piece 19, may be provided each with at least one circumferential annulus 20 and 21 surrounding their periphery. This annulus 20 and 21 provides an efficient sealing between the ports 12 and 18, the carrier 19 and the connecting piece 13. Said annuli 20 and 21 are conveniently formed so that they have one wall sloping in the direction of their insertion into the corresponding port. This makes easy the introduction of these elements into these ports. Said sloping wall transits from its apex into a radially positioned wall. This configuration provides an effective retaining shoulder, which works as a hooking part obstructing falling and pulling out of the constructional elements 13 and 19.

It is apparent that the constructional elements provided with the so formed annuli have therein arranged the material mass so that it progressively increases from the periphery towards the center of the elements. Consequently, the annuli are substantially flexible around their peripheries, as a lip-like annulus would be, so that they adjust themselves to the dimensions of the respective ports and provide therein a good sealing. With the material mass radially increasing, the resistance of the annuli against axial motion also grows up, so that a reliable firmness is provided for engagement of the elements 13 and 19 inside the ports of the liquid supplying channel 15.

The cross-guard 10 is shown as having anchored therein a threaded bolt 22 located against a corresponding threaded hole drilled into the bumper. This threaded bolt 22 serves for fixing the cross-guard to the motor car bumper. Thus, the cross-guard 10 is kept in position both by this threaded bolt and its rear notch 17 engaged with, and encompassing, the bumper. This threaded bolt 22, together with this notch 17, also provides a firm alignment of the crossguard 10 in regard to the lightlamp of the motor car.

Figure 2:
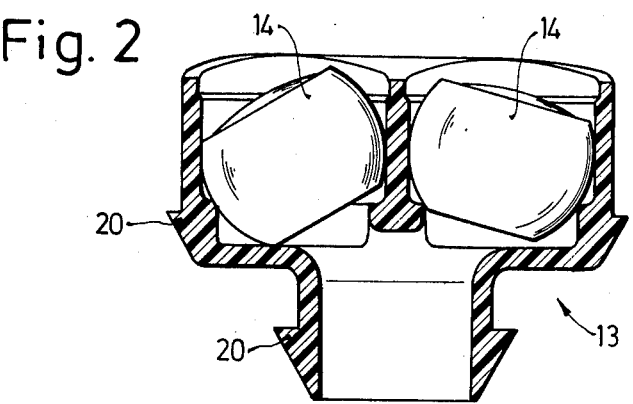
FIG. 2 shows on a larger scale a cross-section through a carrier for a pair of nozzle bodies employed in an embodiment slightly different from that displayed by FIG. 1.

Another, slightly modified embodiment of the arrangement of the present invention is illustrated by FIG. 2.

In the embodiment shown in FIG. 1, one nozzle body 14 is diplayed located in the outlet port 12 of the liquid supplying channel 15. For this purpose, this outlet port 12 is formed so that it mates with the nozzle body 14. In this case, the nozzle body 14 is provided with the mentioned at least one peripheral annulus around its circumference. The nozzle body 14 also may be fixed to a carrier 13 and this carrier may be inserted into the outlet port 12. In this case, this carrier is provided with the mentioned at least one peripheral annulus.

FIG. 2 displays a carrier 13 whereto a pair of nozzle bodies are fixed. The carrier 13 also has the mentioned at least one peripheral annulus around its circumference. Here, the nozzle bodies are shown as being aimed at the lens shield at different angles.

The washing liquid may be stored in, and supplied from, a container wherein it is kept in pressurized condition. In this case, a selectively operable liquid releasing means is provided on the path from the container to the nozzle body 14. But it is preferable to locate this means on the nozzle body or the container.

This liquid releasing means is operable for opening passage of the washing liquid from the container thereof through the liquid supplying channel to the nozzle body.

The washing liquid also may be stored in the container under normal pressure. In this particular case, a pump and is associated with the container and a switch is provided arranged to start and stop the operation of this pump. The pump propels the washing liquid from the container towards the nozzle.

While the invention has been illustrated and described as reduced to practice in the arrangements displayed in FIGS. 1 and 2, it is not intended to be limited to the details shown, since various modifications and structural changes may be made without departing in any way from the spirit of the invention.

It will be understood that each of the elements described above, or two of more thereof, may also find a useful application in the types of arrangements and devices differing from the types described above.

Without further analysis, the foregoing will so fully reveal the gist of the present invention that others can, by applying current knowledge, readily adapt it for various applications, without omitting features that, from the standpoint of the prior art, fairly constitute essential characteristics of the generic and specific aspects of this invention and, therefore, such adaptations should, and are intended to, be comprehended within the meaning and range of equivalences of the following claims.

What we claim is:

1. In a vehicle, an arrangement for washing lens shields of vehicle lamps, comprising a bumper having a bumper guard, said guard having a portin of solid cross-section; supply means for washing liquid; a spray nozzle means mounted on said bumper guard of the vehicle so as to face towards the lens shield; a channel passage extending through said solid portion of the bumper guard and connecting said liquid supply means with said nozzle means; and means for propelling said liquid towards said nozzle means.

2. An arrangement as defined in claim 1, wherein said channel passage has an inlet port at one end thereof and an outlet port at the other end thereof.

3. An arrangement as defined in claim 2, wherein said spray nozzle means is associated with said outlet port.

4. An arrangement as defined in claim 3, wherein both said inlet port and said outlet port have a diameter larger than that of the remainder of said channel passage.

5. An arrangement as defined in claim 3, wherein said nozzle means is a nozzle body press-fit inserted in said outlet port.

6. An arrangement as defined in claim 3, wherein said nozzle body is inserted into said outlet port with prestress.

7. An arrangement as defined in claim 4, wherein said liquid supply means includes a liquid conduit having a terminal portion provided with a connecting piece engaged in said inlet port.

8. An arrangement as defined in claim 7, wherein said solid bumper guard portion is made of an elastic material yielding to pressure, so that said nozzle means and said connecting piece may be inserted into, respectively, said outlet port and said inlet port elastically enlarged.

9. An arrangement as defined in claim 7, wherein said connecting piece is provided with at least one peripheral annulus having a wall sloping in the direction of insertion of said connecting piece into said inlet port and having, opposite to said sloping wall, a radially positioned rear wall obstructing falling out and extraction of said connecting piece from said inlet port.

10. An arrangement as defined in claim 7, wherein said nozzle body is provided with at least one peripheral annulus having a wall sloping in the direction of insertion of said nozzle body into said outlet port and having, opposite to said sloping wall, a radially positioned rear wall obstructing falling out and extraction of said nozzle body from said outlet port.

11. An arrangement as defined in claim 4, wherein said nozzle body is fixed to a carrier inserted in said outlet port with prestress.

12. An arrangement as defined in claim 4, wherein both said nozzle body and said connecting piece are made of an elastic material.

13. An arrangement as defined in claim 1, wherein said supply means for washing liquid includes a container and a liquid conduit communicating with said container and having a terminal portion distant from said container and provided with a connecting piece engaged in said inlet port.

14. An arrangement as defined in claim 13, wherein said container stores the washing liquid in pressurized condition and said liquid releasing means is provided on said nozzle body and is connected to means actuable by the driver to cause release of the washing liquid.

15. An arrangement as defined in claim 13, wherein said container has associated thereto a selectively operable pump and said releasing means includes a switch connected to said pump and actuable to start and stop the operation of said pump.

16. An arrangement as defined in claim 13, wherein means is provided for attachment of said solid bumper guard portion to the vehicle bumper.

17. An arrangement as defined in claim 16, wherein said attachment means includes a threaded bolt firmly anchored in said bumper guard and projecting from said solid portion of said guard by a threaded portion thereof screwable into a female threading provided in the bumper whereto the guard is to be fixed.

18. An arrangement as defined in claim 17, wherein said attachment means includes a notch provided on the rear side of said solid portion of the bumper guard which notch has a form conformed to the cross-section of said bumper, so that when said solid portion is engaged on said notch with the bumper a stable alignment of the solid portion of said bumper is achieved.

* * * * *